(12) United States Patent
Coussement

(10) Patent No.: US 10,057,363 B2
(45) Date of Patent: *Aug. 21, 2018

(54) DISTRIBUTED HARDWARE/SOFTWARE SYSTEM FOR MANAGING AGENT STATUS IN A COMMUNICATION CENTER

(71) Applicant: Genesys Telecommunications Laboratories, Inc., Daly City, CA (US)

(72) Inventor: Stefaan Valere Albert Coussement, Kortrijk (BE)

( * ) Notice: Subject to any disclaimer, the term of this patent is extended or adjusted under 35 U.S.C. 154(b) by 0 days.

This patent is subject to a terminal disclaimer.

(21) Appl. No.: 15/231,631

(22) Filed: Aug. 8, 2016

(65) Prior Publication Data

US 2016/0352849 A1 Dec. 1, 2016

Related U.S. Application Data

(63) Continuation of application No. 14/834,307, filed on Aug. 24, 2015, now Pat. No. 9,413,892, which is a continuation of application No. 14/316,773, filed on Jun. 26, 2014, now Pat. No. 9,118,624, which is a continuation of application No. 13/773,486, filed on Feb. 21, 2013, now Pat. No. 8,837,709, which is a continuation of application No. 13/233,440, filed on
(Continued)

(51) Int. Cl.
| H04M 3/00 | (2006.01) |
| H04M 5/00 | (2006.01) |
| H04L 29/08 | (2006.01) |
| H04M 3/51 | (2006.01) |
| H04M 3/523 | (2006.01) |
| H04M 3/42 | (2006.01) |
| H04M 7/00 | (2006.01) |

(52) U.S. Cl.
CPC .............. *H04L 67/24* (2013.01); *H04L 67/02* (2013.01); *H04L 67/28* (2013.01); *H04M 3/5175* (2013.01); *H04M 3/5183* (2013.01); *H04M 3/5191* (2013.01); *H04M 3/523* (2013.01); *H04M 3/5237* (2013.01); *H04M 7/006* (2013.01); *H04M 7/0069* (2013.01); *H04M 3/42102* (2013.01); *H04M 3/42365* (2013.01); *H04M 7/00* (2013.01); *H04M 2203/6018* (2013.01)

(58) Field of Classification Search
CPC ........................... H04M 3/5175; H04M 7/006
USPC .................. 379/265.06, 265.09, 266.01, 309
See application file for complete search history.

(56) References Cited

U.S. PATENT DOCUMENTS

| 4,510,351 A | 4/1985 | Costello et al. |
| 5,274,700 A | 12/1993 | Gechter et al. |
(Continued)

FOREIGN PATENT DOCUMENTS

| EP | 1237347 B1 | 11/2014 |
| WO | 9914920 A1 | 3/1999 |

OTHER PUBLICATIONS

Day, M., et al., A Model for Presence and Instant Messaging, XP-002201444 Network Working Group, Feb. 2000, 17 pages.
(Continued)

*Primary Examiner* — Quynh Nguyen

(57) ABSTRACT

An agent presence application for monitoring target agent resources and rendering agent states to subscribing applications is provided. The presence application has at least one first portion for collecting data regarding states of activity of the target agent resources, and at least one second portion for integrating the data and rendering the agent states to the to subscribing applications.

18 Claims, 6 Drawing Sheets

Related U.S. Application Data

Sep. 15, 2011, now Pat. No. 8,437,463, which is a continuation of application No. 09/791,282, filed on Feb. 22, 2001, now Pat. No. 8,031,860.

(56) References Cited

U.S. PATENT DOCUMENTS

| | | |
|---|---|---|
| 5,450,482 A | 9/1995 | Chen et al. |
| 5,590,188 A | 12/1996 | Crockett |
| 5,592,543 A | 1/1997 | Smith et al. |
| 5,790,798 A | 8/1998 | Beckett, II et al. |
| 5,926,539 A | 7/1999 | Shtivelman |
| 5,953,405 A | 9/1999 | Miloslavsky |
| 6,005,932 A | 12/1999 | Bloom |
| 6,076,093 A | 6/2000 | Pickering |
| 6,128,380 A | 10/2000 | Shaffer et al. |
| 6,185,287 B1 | 2/2001 | Miloslavsky |
| 6,392,666 B1 | 5/2002 | Hong et al. |
| 6,404,743 B1 | 6/2002 | Meandzija |
| 6,424,709 B1 | 7/2002 | Doyle et al. |
| 6,490,350 B2 | 12/2002 | McDuff et al. |
| 6,553,113 B1 | 4/2003 | Dhir et al. |
| 6,556,671 B1 | 4/2003 | Beauvois |
| 6,560,329 B1 | 5/2003 | Draginich et al. |
| 6,681,010 B1 | 1/2004 | Anderson et al. |
| 6,687,241 B1 | 2/2004 | Goss |
| 6,708,163 B1 | 3/2004 | Kargupta et al. |
| 6,766,012 B1 | 7/2004 | Crossley |
| 6,771,765 B1 | 8/2004 | Crowther et al. |
| 6,922,689 B2 | 7/2005 | Shtivelman |
| 7,092,509 B1 | 8/2006 | Mears et al. |
| 7,801,111 B2 | 9/2010 | Coussement |
| 8,031,860 B2 | 10/2011 | Coussement |
| 8,437,463 B2 | 5/2013 | Coussement |
| 2004/0028213 A1 | 2/2004 | Goss |
| 2013/0166624 A1 | 6/2013 | Coussement |

OTHER PUBLICATIONS

EP OA for Application 02 400 012.7 dated May 8, 2006, 6 pages.
EP OA for Application No. 02 003 243.9 dated Mar. 2, 2011, 4 pages.
EP OA for Application No. 02 003 243.9 dated Nov. 28, 2007, 5 pages.
EP OA for Application No. 02 003 243.9 dated Dec. 20, 2012, 5 pages.
EP OA for Application No. 02 400 012.7 dated Apr. 9, 2009, 3 pages.
EP OA for Application No. 02 400 012.7 dated Sep. 12, 2012, 5 pages.
Rosenberg, J. et al., SIP for Presence, XP-002325320 Internet Engineering Task Force, Nov. 13, 1998, 21 pages.

DISTRIBUTED HARDWARE/SOFTWARE SYSTEM FOR MANAGING AGENT STATUS IN A COMMUNICATION CENTER

CROSS-REFERENCE TO RELATED APPLICATIONS

This application is a continuation of U.S. patent application Ser. No. 14/834,307, filed Aug. 24, 2015, now issued as U.S. Pat. No. 9,413,892, which is a continuation of U.S. patent application Ser. No. 14/1316,773, filed on Jun. 26, 2014, now issued as U.S. Pat. No. 9118,624, which is a continuation of 13/773,486, filed on Feb. 21, 2013, now issued as U.S. Pat. No. 8,837,709, which is a continuation of U.S. patent application Ser. No. 13/233,440, filed on Sep. 15, 2011, now issued as U.S. Pat. No. 8,437,463, which is a continuation of U.S. patent application Ser. No. 09/791,282, filed on Feb. 22, 2001, now issued as U.S. Pat. No. 8,031,860, the disclosures of which are hereby incorporated by reference in their entireties.

FIELD OF THE INVENTION

The present invention is in the field of telecommunication, encompassing all existing sorts of interaction multimedia technology, and pertains more particularly to a system for managing agent status information within a communications-center.

BACKGROUND OF THE INVENTION

In the field of telephony communication, there have been many improvements in technology over the years that have contributed to more efficient use of telephone communication within hosted call-center environments. Most of these improvements involve integrating the telephones and switching systems in such call centers with computer hardware and software adapted for, among other things, better routing of telephone calls, faster delivery of telephone calls and associated information, and improved service with regard to client satisfaction. Such computer-enhanced telephony is known in the art as computer-telephony integration (CTI). Generally speaking, CTI implementations of various design and purpose are implemented both within individual call-centers and, in some cases, at the telephone network level. For example, processors running CTI software applications may be linked to telephone switches, service control points (SCP), and network entry points within a public or private telephone network. At the call-center level, CTI-enhanced processors, data servers, transaction servers, and the like, are linked to telephone switches and, in some cases, to similar CTI hardware at the network level, often by a dedicated digital link. CTI processors and other hardware within a call-center is commonly referred to as customer premises equipment (CPE). It is the CTI processor and application software is such centers that provides computer enhancement to a call center.

In a CTI-enhanced call center, telephones at agent stations are connected to a central telephony switching apparatus, such as an automatic call distributor (ACD) switch or a private branch exchange (PBX). The agent stations may also be equipped with computer terminals such as personal computer/video display units (PCNVDU) so that agents manning such stations may have access to stored data as well as being linked to incoming callers by telephone equipment. Such stations may be interconnected through the PC VDU by a local area network (LAN). One or more data or transaction servers may also be connected to the LAN that interconnects agent stations. The LAN is, in turn, typically connected to the CTI processor, which is connected to the call switching apparatus of the call center.

When a call arrives at a call center, whether or not the call has been pre-processed at an SCP, typically at least the telephone number of the calling line is made available to the receiving switch at the call center by the network provider. This service is available by most networks as caller-ID information in one of several formats such as Automatic Number Identification (ANI). Typically the number called is also available through a service such as Dialed Number Identification Service (DNIS). If the call center is computer-enhanced (CTI), the phone number of the calling party may be used as a key to access additional information from a customer information system (CIS) database at a server on the network that connects the agent workstations. In this manner information pertinent to a call may be provided to an agent, often as a screen pop on the agent's PCNVDU.

In recent years, advances in computer technology, telephony equipment, and infrastructure have provided many opportunities for improving telephone service in publicly switched and private telephone intelligent networks. Similarly, development of a separate information and data network known as the Internet, together with advances in computer hardware and software have led to a new multimedia telephone system known in the art by several names. In this new systemology, telephone calls are simulated by multimedia computer equipment, and data, such as audio data, is transmitted over data networks as data packets. In this system the broad term used to describe such computer-simulated telephony is Data Network Telephony (DNT).

For purposes of nomenclature and definition, the inventors wish to distinguish clearly between what might be called conventional telephony, which is the telephone service enjoyed by nearly all citizens through local telephone companies and several long-distance telephone network providers, and what has been described herein as computer-simulated telephony or data-network telephony. The conventional systems are referred to herein as Connection-Oriented Switched-Telephony (COST) systems, CTI enhanced or not.

The computer-simulated, or DNT systems are familiar to those who use and understand computers and data-network systems. Perhaps the best example of DNT is telephone service provided over the Internet, which will be referred to herein as Internet Protocol Network Telephony (IPNT), by far the most extensive, but still a subset of DNT.

Both systems use signals transmitted over network links. In fact, connection to data networks for DNT such as IPNT is typically accomplished over local telephone lines, used to reach points in the network such as an Internet Service Provider (ISP). The definitive difference is that COST telephony may be considered to be connection-oriented telephony. In the COST system, calls are placed and connected by a specific dedicated path, and the connection path is maintained over the time of the call. Bandwidth is basically assured. Other calls and data do not share a connected channel path in a COST system. A DNT system, on the other hand, is not dedicated or connection-oriented. That is, data, including audio data, is prepared, sent, and received as data packets over a data-network. The data packets share network links, and may travel by varied and variable paths.

Recent improvements to available technologies associated with the transmission and reception of data packets during real-time DNT communication have enabled companies to successfully add DNT, principally IPNT, capabilities to existing CTI call centers. Such improvements, as described herein and known-to the inventor, include methods for guaranteeing available bandwidth or quality of service (QOS) for a transaction, improved mechanisms for organizing, coding, compressing, and carrying data more efficiently using less bandwidth, and methods and apparatus for intelligently replacing lost data via using voice supplementation methods and enhanced buffering capabilities.

In addition to Internet protocol (IPNT) calls, a DNT center may also share other forms of media with customers accessing the system through their computers. E-mails, video mails, fax, file share, file transfer, video calls, and so forth are some of the other forms of media, which may be used. This capability of handling varied media leads to the term multimedia communications center. A multimedia communications center may be a combination CTI and DNT center, or may be a DNT center capable of receiving COST calls and converting them to a digital DNT format. The term communication center will replace the term call center hereinafter in this specification when referring to multimedia capabilities.

In typical communication centers, DNT is accomplished by Internet connection and IPNT calls. For this reason, IPNT and the Internet will be used in examples to follow. IT should be understood, however, that this usage is exemplary, and not limiting.

In systems known to the inventors, incoming IPNT calls are processed and routed within an IPNT-capable communication center in much the same way as COST calls are routed in a CTI-enhanced call-center, using similar or identical routing rules, waiting queues, and so on, aside from the fact that there are two separate networks involved. Communication centers having both CTI and IPNT capability utilize LAN-connected agent-stations with each station having a telephony-switch-connected headset or phone, and a PC connected, in most cases via LAN, to the network carrying the IPNT calls. Therefore, in most cases, IPNT calls are routed to the agent's PC while conventional telephony calls are routed to the agent's conventional telephone or headset. Typically separate lines and equipment must be implemented for each type of call weather COST or IPNT.

Due in part to added costs associated with additional equipment, lines, and data ports that are needed to add IPNT capability to a CTI-enhanced call-center, companies are currently experimenting with various forms of integration between the older COST system and the newer IPNT system. For example, by enhancing data servers, interactive voice response units (IVR), agent-connecting networks, and so on, with the capability of conforming to Internet protocol, call data arriving from either network may be integrated requiring less equipment and lines to facilitate processing, storage, and transfer of data.

With many new communication products supporting various media types available to businesses and customers, a communication center must add significant application software to accommodate the diversity. For example, e-mail programs have differing parameters than do IP applications. IP applications are different regarding protocol than COST calls, and so on. Separate routing systems and/or software components are needed for routing e-mails, IP calls, COST calls, file sharing, etc. Agents must then be trained in the use of a variety of applications supporting the different types of media.

Keeping contact histories, reporting statistics, creating routing rules and the like becomes more complex as newer types of media are added to communication center capability. Additional hardware implementations such as servers, processors, etc. are generally required to aid full multimedia communication and reporting. Therefore, it is desirable that interactions of all multimedia sorts be analyzed, recorded, and routed according to enterprise (business) rules in a manner that provides seamless integration between media types and application types, thereby allowing agents to respond intelligently and efficiently to customer queries and problems.

One challenge that is ever present in a communications center is the ability to communicate current communication center status to customers attempting to reach the center for service. Older call-centers relying on COST communication techniques simply play recorded messages, the recordings informing the customers of the status of an agent being called. More advanced communication centers, including multimedia centers, have extensive automated services in place for interacting with customers in the event that no agents are available. Most of these services are IVR driven and inform callers of options, as well as status of those persons the callers are attempting to connect with.

Estimated call-waiting times may be determined during a call attempt and communicated to the caller through IVR interaction. The number of calls ahead of a current calls may also be provided as status information. A customer must invest the time and inconvenience of placing a call to the communication center in order to receive the status information. As described above, this information is made available through IVR interaction in prior art systems. In general, a call placed into the communications center must be paid for either by the customer placing the call, or by the center itself. It has occurred to the inventor that money and center resource could be conserved by providing status information to customers without requiring a physical call to be placed to the center.

A network-based system known to the inventor and taught in a separate application enables users of the system to obtain current agent-status information related to agents of an information-source facility connected to the network before initiating contact with the agent or agents of the information-source facility. The system uses a status-server node connected to the information-source facility (communication center) and to the network. The system also uses an interface-server node connected to the status node and to the network. The status-server node is accessible to the interface node by virtue of the network connectivity. A user operating a network-capable appliance connects to the interface node by virtue of network connection capability. Software distributed on at least the status and interface server nodes enables distribution of the agent-status information to the user operating the appliance.

The agent-status information is accessed from the status server node connected to the communication center by the interfacing server node and delivered to the requesting user over the operating network. The system components communicate according to any one of several known Instant Messaging protocols such as IMPP-RFC 2778. An enhancement to the above system enables agents in dialogue with users to be able to view availability status and callback preferences established at the users end.

The enhanced system uses a status server node connected to the information-source facility (communication center) and to the network and an interfacing server node connected to the first server node and to the network. The interfacing server node is accessible from the status server node by virtue of the network connectivity. A client accesses the interface server node using a network-capable appliance connected to the network.

The client either posts his or her status information at the interfacing server node, or the interfacing server node polls the client for status while the client is connected. An agent-user operating from a LAN connected agent workstation has access to the status server node, which in turn polls the interfacing server node. Software distributed on both server nodes enables distribution of the client-status information to requesting agents. The agent-user operating the agent workstation accesses the status server node and subscribes to the client-status information about one or more clients. The client-status information is accessed from the interfacing server node by the status server node and delivered to the requesting agent-user. The above-described system uses a presence protocol to propagate data from node to node on the network.

A personal interaction system for enabling customers of a communication center to change and manipulate personal information, as well as to view personalized interaction and resource data from a single interface is also known to the inventor and is taught in a separate application. The system incorporates a personalized interaction application for enabling client interaction with communication-center resources and brokerage of presence information related to both agents of the communication center and to clients of the center.

The interaction application comprises an interactive user interface for posting client data and for receiving and displaying agent data and interaction data, a brokering application for receiving data from both the client and the communication center for incorporation into the user interface and for managing propagation of instant messaging between a client and agents of the center and, a status monitoring and reporting application for monitoring and reporting agent status and client status and for accessing and serving communication center resource data.

A client accessing and interacting with the user interface portion of the application may add and edit personal information, request and receive product information, request and view current activity status within the communication center, and request and view personal interaction history recorded by the communication center without initiating and executing a live communication event to the center. In preferred embodiments, the application uses a presence protocol and is enhanced with instant messaging capability as described above with the agent availability and client status availability systems. Moreover, the functionality of all three systems may be combined into one system using one interface for the client.

As can be seen from the description the above, using an Instant Message protocol provides obvious advantages to both agents and clients operating in an IP environment hosted by a communication center. However, the task of monitoring and managing multiple states of agents operating within the center is quite formidable given prior-art methods. In state-of-the-art communication centers agents are responsible not only for handling a variety of communication-event types but also must typically manage more than one communication terminal or device. For example, COST interaction is typically handled by a COST telephone, while IP telephony is conducted with an IP-capable telephone or on a PC. An agent may also handled pager messages on a pager, e-mail messages on a PC, fax correspondence on a fax machine, or may have even other, non-electronic duties, communicated to his computer, such as filling out and stamping a document etc.

Prior art methods for monitoring agent states are typically CTI implementations executing on a central routing device or hosted on a central server connected by a LAN to participating agents. Therefore, all of the agent's possible communication means may not be accessible to the system. Moreover, resolution of agent states to single communication applications is not possible. An associated problem with implementing a centrally controlled agent monitoring system is lack of feasible scalability. For example, up-scaling such a system would require addition of more central servers and providing extensive integration solutions for various communication technologies.

Another issue is that many professional agents are accustomed to or required by regulations to use certain software implements and platforms related to their communication duties. Centrally controlled agent-state monitoring systems generally require all agents to use like software (communications applications) and be operating like platforms. In this case, new agents must be trained to use applications supported by the monitoring system. Still further, many clients of the communication center may use applications that agents also use, but which are not supported by a communication center's state-monitoring system. Therefore, some pending interactions, which are of importance to the center, may not take place because the supported mediums of communication were determined to be busy at the time of the interaction. Opportunities for communication may be missed although communication could have taken place if the specific application shared by the client and by the agent were known and reportable as a state-option to the customer.

There are many instances wherein detailed reporting of all of an agent's active states is useful, especially in instances of internal routing of interactions arriving within the communication center. Observing applications used in current communication centers do not have sufficient access to all of an agent's possible activity states as may be related to individual communications mediums and especially related to specific communications applications as noted above. Further, existing applications are typically centralized and difficult to scale.

Therefore, what is clearly needed is a distributed system for monitoring and reporting agent states and communication abilities to subscribing applications that does not require management from a central server or expensive software integration solutions. Such a system would be easily scalable and much more reliable than current centrally controlled systems.

SUMMARY OF THE INVENTION

In a preferred embodiment of the present invention an agent presence application for monitoring target agent resources and rendering agent states to subscribing applications is provided, comprising a first portion for collecting data regarding states of activity of the target agent resources, and a second portion for integrating the data and rendering the agent states to the subscribing applications. In some embodiments the target agent resources comprise one or more individual agent stations in at least one communication center, the agent stations equipped with one or more communication devices. Also in some embodiments multiple copies or versions of the first portion execute on platforms monitoring individual ones of the one or more communication devices, and provide data to at least one agent proxy server executing a copy of the second portion, the at least one agent proxy server dedicated to integrating the data for the one or more communication devices.

In some embodiments one or more of the platforms upon which the first portions execute are computers in the agent stations, while in others one or more of the platforms upon which the first portions execute comprise individual ones of the one or more communication devices. In still other embodiments one or more of the platforms upon which the first portions execute comprise individual service proxy platforms also enabling services for one of the communication devices. The service proxy platform may be, for example, a Voice-over-Internet Protocol (VoIP) proxy enabling a VoIP telephone, or a call-control gateway platform. In some embodiments the first portions provide data to more than one agent proxy server to provide redundancy.

In some cases the platforms, agent stations and subscribing applications are all a part of a single communication center, while in other cases the platforms, agent stations and subscribing applications are distributed over a plurality of communication centers.

In some instances more than one first portion is dedicated each to distinct ones of the communication devices associated with a single agent station, and the data from the more than one first portion is aggregated for the single agent station at the agent proxy server associated with the single agent station. In other cases there may be multiple sets of agent stations having communication devices monitored by the copies or versions of the first portion and multiple agent proxy servers executing copies of the second portion, wherein agent proxy servers are associated in a hierarchical fashion, such that higher-level agent proxy servers aggregate data from multiple lower-level agent proxy servers with which each higher-level server is associated, the aggregated data at the higher level servers comprising data from all of the agent stations associated with each of the lower-level servers. Again, in these cases the platforms, agent stations and subscribing applications may be all a part of a single communication center, or distributed over a plurality of communication centers. In particular cases the subscribing applications include communication-routing applications.

In another aspect of the invention an agent proxy system operable in at least one communication center is provided, the system comprising agent resources enabling agents to process communication events, one or more agent proxy servers, one or more subscribing applications subscribing to one or more of the agent proxy servers, a communication network connecting the agent resources, the applications and the one or more agent proxy servers, and an agent presence application for monitoring states of the agent resources and for rendering agent states to the subscribing applications, the presence application having a first portion for collecting data regarding states of activity of the target agent resources, and a second portion for integrating the data and rendering the agent states to the subscribing applications.

In some embodiments the agent resources comprise one or more individual agent stations in at least one communication center, the agent stations equipped with communication devices, and in some embodiments multiple copies or versions of the first portion execute on platforms monitoring individual ones of the one or more communication devices, and provide data to at least one agent proxy server executing a copy of the second portion, the at least one agent proxy server dedicated to integrating the data for the one or more communication devices.

In some cases one or more of the platforms upon which the first portions execute are computers in the agent stations, while in other cases one or more of the platforms upon which the first portions execute comprise individual ones of the one or more communication devices, and in still other cases one or more of the platforms upon which the first portions execute comprise individual service proxy platforms also enabling services for one of the communication devices.

The service proxy platform may be a Voice-over-Internet-Protocol (VoIP) proxy enabling a VoIP telephone, for example, or a call-control gateway platform. In some cases the first portions provide data to more than one agent proxy server to provide redundancy. Also, the platforms, agent stations and subscribing applications may be all a part of a single communication center, or distributed over a plurality of communication centers.

In some cases more than one first portion is dedicated each to distinct ones of the communication devices associated with a single agent station, and the data from the more than one first portion is aggregated for the single agent station at the agent proxy server associated with the single agent station. There may be multiple sets of agent stations having communication devices monitored by the copies or versions of the first portion and multiple agent proxy servers executing copies of the second portion, wherein agent proxy servers are associated in a hierarchical fashion, such that higher-level agent proxy servers aggregate data from multiple lower-level agent proxy servers with which each higher-level server is associated, the aggregated data at the higher level servers comprising data from all of the agent stations associated with each of the lower-level servers. In all of these cases the platforms, agent stations and subscribing applications may be all a part of a single communication center, or distributed over a plurality of communication centers. In special cases the subscribing applications include communication-routing applications.

In still another aspect of the invention, in a communication center system, a method for providing agent status to subscribing applications is provided, comprising the steps of (a) monitoring status of individual agent resources by a first portion of an agent presence application; and (b) integrating data from step (a) and rendering agent status to the subscribing applications by a second portion of the agent presence application. In some embodiments, in step (a), the agent resources comprise individual agent stations equipped with one or more communication devices.

In some embodiments multiple copies or versions of the first portion execute on platforms monitoring individual ones of the one or more communication devices, and provide data to at least one agent proxy server executing a copy of the second portion, the at least one agent proxy server dedicated to integrating the data for the one or more communication devices. In some embodiments one or more of the platforms upon which the first portions execute are computers in the agent stations, while in others one or more of the platforms upon which the first portions execute comprise individual ones of the one or more communication devices, and in still others one or more of the platforms upon which the first portions execute comprise individual service proxy platforms also enabling services for one of the communication devices. The service proxy platform may be a Voice-over-Internet-Protocol (VoIP) proxy enabling a VoIP telephone, for example, or a call-control gateway platform.

In some cases the first portions provide data to more than one agent proxy server to provide redundancy. The platforms, agent stations and subscribing applications may be all a part of a single communication center, or distributed over a plurality of communication centers.

In some cases more than one first portion is dedicated each to distinct ones of the communication devices associated with a single agent station, and the data from the more than one first portion is aggregated for the single agent station at the agent proxy server associated with the single agent station. Further there may be multiple sets of agent stations having communication devices monitored by the copies or versions of the first portion and multiple agent proxy servers executing copies of the second portion, wherein agent proxy servers are associated in a hierarchical fashion, such that higher-level agent proxy servers aggregate data from multiple lower-level agent proxy servers with which each higher-level server is associated, the aggregated data at the higher level servers comprising data from all of the agent stations associated with each of the lower-level servers.

In these cases as well, the platforms, agent stations and subscribing applications may be all a part of a single communication center, or distributed over a plurality of communication centers. In special cases the subscribing applications include communication-routing applications.

Now, for the first time, a distributable software system for managing agent states that does not require management from a central server or expensive software integration solutions is provided. The system is easily scalable and much more reliable than current centrally controlled systems.

BRIEF DESCRIPTION OF THE DRAWING FIGURES

DESCRIPTION OF THE PREFERRED EMBODIMENTS

In accordance with a preferred embodiment of the present invention the inventor provides a distributable software application for improving the reporting of various active agent-states related to communication capabilities to subscribing applications within, or in some cases external to a communication-center. The method and apparatus of the present invention is described in enabling detail below.

Figure 1:
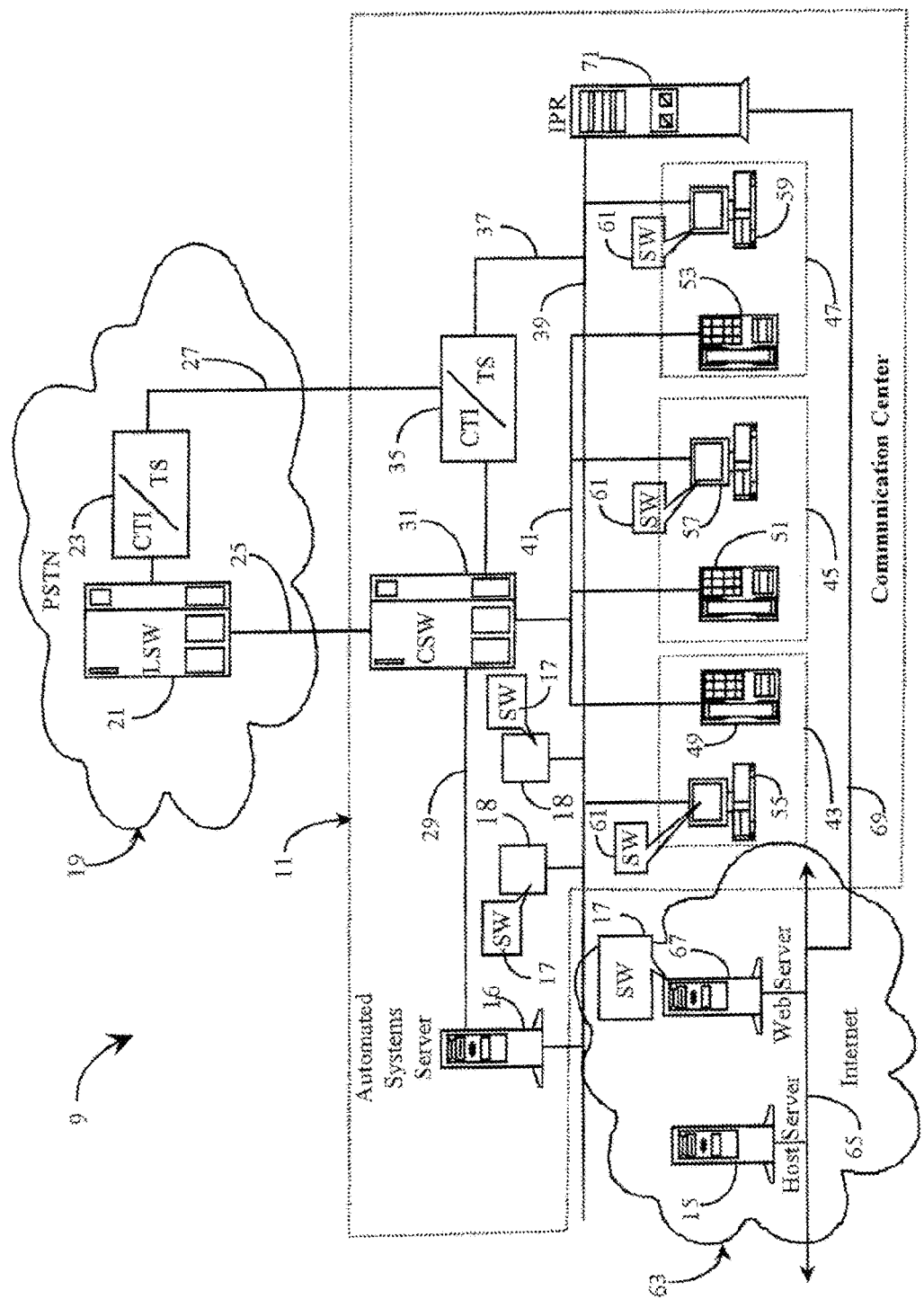
FIG. 1 is an overview of a communication network wherein a distributed system for managing agent status is utilized according to an embodiment of the present invention.

FIG. 1 is an overview of a communication network 9 wherein a distributed system for monitoring agent status and communication ability, and making the information available to subscribing applications is utilized according to an embodiment of the present invention. Communication network 9 comprises a public-switched-telephone-network (PSTN 19), a data-packet-network (DPN) 63, which in a preferred embodiment is the well-known Internet network, and a communication center 11.

PSTN 19 may, in an alternative embodiment, be a private telephone network instead of a public one as exemplified herein. DPN 63, which in this example is the well-known Internet, is chosen by the inventor as a preferred DPN because of its high public-access characteristic. Hereinafter DPN 63 will simply be referred to as Internet 63. Internet 63 may instead be a corporate or private wide-area-network (WAN) without departing from the spirit and scope of the present invention. Internet 63 is further exemplified by an Internet backbone 65 illustrated as extending through cloud 63. Backbone 65 represents all of the lines, connections and equipment making up the Internet network as a whole. Therefore, there are no geographic limitations to practice the present invention.

Communication center 11 represents a state-of-the-art communication center capable of handling both COST interactions and DNT interactions including those using Internet Protocol (IP). Communications center 11 may be any type of communication center or information-source facility. A good example of communication center 11 would be that of a customer-assistance center for a large computer manufacturer. Communication center 11 may be a very large center employing hundreds of agents or a very small center employing just a few agents without departing from the spirit and scope of the present invention.

PSTN 19 represents the mediums through which all COST calls destined to communication center 11 are propagated. A local switch (LSW) 21 is illustrated within PSTN 19 and represents a telephony switch as known in the art for switching calls. In this example, LSW 21 is connected to a central switch (CSW) 31 illustrated within communication center 11 by a telephony trunk 25. LSW 21 as well as CSW 31 may be automatic-call-distributor (ACD) switches or any other known telephone switches capable of processing COST events.

A computer-telephony-integration (CTI) processor 23 is provided within PSTN 19 connected to LSW 21 by a CTI link. CTI processor 23 is adapted to provide at least intelligent routing capability to LSW 21. A similar CTI processor 35 is provided within communication center 11 and is illustrated as connected to CSW 31 by a CTI link. CTI processor 35 is adapted to provide at least intelligent routing capability to CSW 31. CTI processor 23 within PSTN 19 is connected to CTI processor 35 within communication center 11 by a data network connection 27 separate from telephone trunk lines. Data network 27 enables extension of intelligent routing routines from within communication center 11 into PSTN 19. More specifically LSW 21, representing just one of many similarly connected switches or Service Control Points (SCP) in the network, may do, for example, agent-level routing by virtue of communication capability between processors 35 and 23. This mechanism enables intelligent network routing of incoming communication events to occur at LSW 21.

Intelligent routing commands are distributed from processor 35 over data network 27 to processor 23 by virtue of a software instance known to the inventor as a transaction server (TS). Intelligent routing capabilities may include, but are not limited to, routing based on agent skills, statistical routing, predictive routing, priority routing, agent-availability routing, and a host of other routing protocols. Data network 27 also enables information about callers to arrive within communication center 11 ahead of connection of the actual calls. In addition to instances of TS illustrated within processor 35 and 23 of this example, other functions may be provided without departing from the spirit and scope of the present invention. Examples include interactive-voice-response (IVR) capability, and other types of intelligent peripheral services.

In some communication networks known to the inventor, the capability exists of bridging, for example, PSTN 19 and Internet 63 such that calls originating from both networks may be routed into and supported by their bridged counterparts. For example, calls originating from PSTN 19 may be converted to DNT calls and routed through Internet 63 to communication center 11. Similarly, calls originating from Internet 63 may be converted to COST events and routed to communication center 11 through PSTN 19. Such functionality is not specifically illustrated in this example but may be assumed to be present in some embodiments.

Also, other media than pure voice calls can be used. For example, web based calls, video calls, video mail, e-mail, chat, chat-relays etc. just to name a few types of "calls" or communications.

Communication center 11 has illustrated therein a plurality of agent workstations such as stations 43, 45, and 47. Stations 43-47 are adapted as communication stations each containing appropriate communications equipment and software used by agents for external and internal communication. In this example each agent workstations 43-47 has at least a personal computer/video display unit (PC/VDU) and a telephone. For example, within agent workstations 43 a PC/VDU 55 and a telephone 49 are illustrated. A PC/VDU 57 and a telephone 51 are illustrated within station 45. A PC/VDU 59 and a telephone 53 are illustrated within station 47. Telephones 49-53 are connected to CSW 31 by internal telephony wiring 41. In other embodiments the agent equipment may be more extensive than that illustrated here, such as WAP-enabled telephones, pagers, fax machines, and more.

It will be apparent to one with skill in the art that there may be many more agent stations operating within communication center 11 than are illustrated in this example. Also, in some cases, some or all of the agents may be "remote agents" working, for example from home, mobile (on the road) or from small satellite offices, rather than from a large, conventional call center. The inventor deems that illustration of three agent stations is adequate for the purpose of explanation and illustration of the present invention. Moreover, in some more advanced embodiments, known to the inventor, telephones 49-53 may be connected to their respective PC/VDUs by physical cabling enabling agents to answer incoming calls using the telephone or the PC/VDU.

PC/VDUs 55-59 share connection to a local-area-network (LAN) 39. In this example, LAN 39 is adapted to support Internet protocols in a addition to other LAN protocols. LAN 39 facilitates intercommunication between agents within communication center 11 and other communication center systems. For example, CTI processor 35 is connected to LAN 39. Information about callers retrieved as a result of interaction with callers at LSW 21, or by peripheral equipment associated with LSW 21, may be distributed to appropriate agent PC/VDUs 55-59 ahead of routed COST calls via data network 27 and LAN 39.

An Internet protocol router (IPR) 71 is provided within communication center 11 and is connected to LAN 39. IPR 71 is also connected to Internet backbone 65 by an Internet access line 69. Internet access line 69 may be a 24×7 Internet connection or a switched Internet connection. IPR 71 routes IP events originating from Internet 63 to appropriate agents. IP events may include e-mails, IPNT phone calls, and so on.

In one embodiment IPR 71 may be further enhanced with digital interactive voice response (DIVR) capability.

An automated systems server (ASS) 16 is illustrated within communication center 11 and is connected to LAN 39 via a LAN connection, and to CSW 31 by a digital data line 29. ASS 16 is adapted as an automated system server capable of initiating one type or many types of automated communication events such as facsimiles, e-mails, voice mails, and other automated response mechanisms. ASS 16 may also be adapted to operate in an outbound campaign mode.

A Web server 67 is provided within Internet 63 and connected to backbone 65. Server 67 is adapted in this embodiment as an interface server maintained within Internet 63 by the same entity hosting communication center 11 in a preferred embodiment. Server 63 is an access point for remote agents working with communication center 11. A host server 15 is also illustrated within Internet 63 and also connected to backbone 65. Host server 15 represents a third-party-hosted customer access point to interface for customers wishing to access communication center 11.

A plurality of software (SW) instances 61 are provided as distributed applications to PC/VDUs 55-59. SW 61 is adapted in a preferred embodiment as a presence agent capable of monitoring the present state of an agent's communication capabilities and current communication states at each agent station operating in communication center 11. In this example, SW 61 embodies a capability of monitoring and reporting agent communication capabilities according to much finer resolution than is practiced and current art. For example, SW 61 may be adapted to include standard communication capabilities such as e-mail, fax, IP phone, ICQ™ and other chat communication applications, file sharing programs, and any instant messenger applications. SW 61 may also report platform and word application parameters such as whether or not and agent has PowerPoint™ installed for Macintosh™ and so on. Also, types of media applications and associated platforms may also be reported by SW 61.

In a preferred embodiment of the present invention a plurality of agent proxies are provided for integrating agent status and communication capabilities and communicating such information to requesting applications. In the present example two agent proxy servers 18 are provided, each connected to LAN 39, and each running a software instance 17. Each of proxies 18 is responsible for and tracks states for one or more agent stations. In the present case one may be dedicated to agent stations 43 and 45, and the other to agent station 47. The skilled artisan will understand, as mentioned above, that there may be many more agent stations than the three shown, and there may also be many more agent proxies than the two shown.

In a communication center of the sort illustrated here there may be hundreds of agent stations varying in equipment and capability and distributed physically over a large premise, such as several floors of one building or over multiple buildings. In such a case there may be an agent proxy 18 executing software 17 on each floor of each building, connected to the LAN that connects all agent stations, with each agent proxy dedicated to and monitoring the agent stations on the same floor.

In some cases the group of agent proxies may be hierarchical. For example, in a very large center having several sites, there may be proxies at a lowest level, each monitoring a group of agent stations, then one or more higher-level proxies integrating the information of the lower-level proxies, such as one for each site, then a highest-level proxy integrating the information of the proxies dedicated to each site. The variations are numerous.

Proxy software 17 is responsible for authenticating an agent or agents assigned to it, as well as for receiving and combining assigned agent's presence information and making the same available to any observing application that subscribes to the information. Each agent running SW 61 has his or her current presence information and communication capabilities reported to a designated proxy or proxies 18. The described distributed system in a preferred embodiment may use a presence protocol to propagate the required information.

As examples of applications that subscribe to agent proxies 18, consider IPR 71 and CTI server 35. Each of these servers executes one or more routing applications for routing incoming events to agent stations. In a preferred embodiment of the present invention each of these servers subscribes t one or more agent proxies 18 for information to aid in efficient and effective routing of incoming events.

In one embodiment, wherein COST clients have an IVR option for routing, the communicated agent capabilities and states may be used to aid a caller with selection of a routing option. Such an option may be based on availability of an agent regarding another application. For example, if a call at LSW 21 is destined for an agent operating at station 47, but presence information indicates to a dedicated agent proxy that the agent is busy on a previous call or other activity, then the presence information may also report to the appropriate proxy that the agent is available using IP-assisted automated ordering wherein the caller elects to place an order through IVR function and is prioritized for that purpose. In this case, it may be that after a caller has entered the requested order information during IVR interaction, his or her call is transferred to the agent's IP phone wherein the agent takes the call and places the current COST call on hold to take the order. In this case the IVR server will be a subscriber to one or more of the agent proxies.

In some embodiments of the invention agents may not be on-site agents as shown in FIG. 1, but may be remote agents operating from home or another site not connected to LAN 39. In this case an instance of agent proxy software 17 may execute on WEB server 67 in Internet 63, wherein the WEB server is hosted by the entity operating communication center 11. In this case the remote agent(s) are tracked by instance 17 operating on server 67, and this instance may report to all the same subscribing applications as described above, such as IPR 71 and CTI 35 for routing incoming events.

Information made available to agent proxies by presence software instances 61 may be propagated on a periodic basis with relatively high frequency such as, perhaps every one minute or so. In a preferred embodiment, however, updates are made in agent status only when status changes. This method minimizes traffic on the LAN or other communication network that may be used.

Agent proxies may be adapted, as described above, to report presence information of a single agent or of a combination of agents, representing a work group, team or queue. There are no limits to the inclusion of varying types of media and communication capabilities utilized by agents within communication center 11. All that is required in order to enable reporting of active states of communication and capabilities to agent proxies is a network connection to the device supporting the communication capabilities or to a third-party component through which communication events of the media and question are routed and monitored. It can be seen in this example that the distributed system of the present invention can be implemented on existing equipment without the addition of a centralized server for managing the process.

In preferred embodiments an agent proxy can combine status information from different terminals and different devices for a single agent into combined information for that agent. This capability is illustrated further below, particularly with reference to FIG. 3. Also, in some embodiments a presence agent will connect to only one or two proxies. Connecting to two proxies provides reliability and redundance. There could be even more redundancy, but this is not typically necessary.

Figure 2:
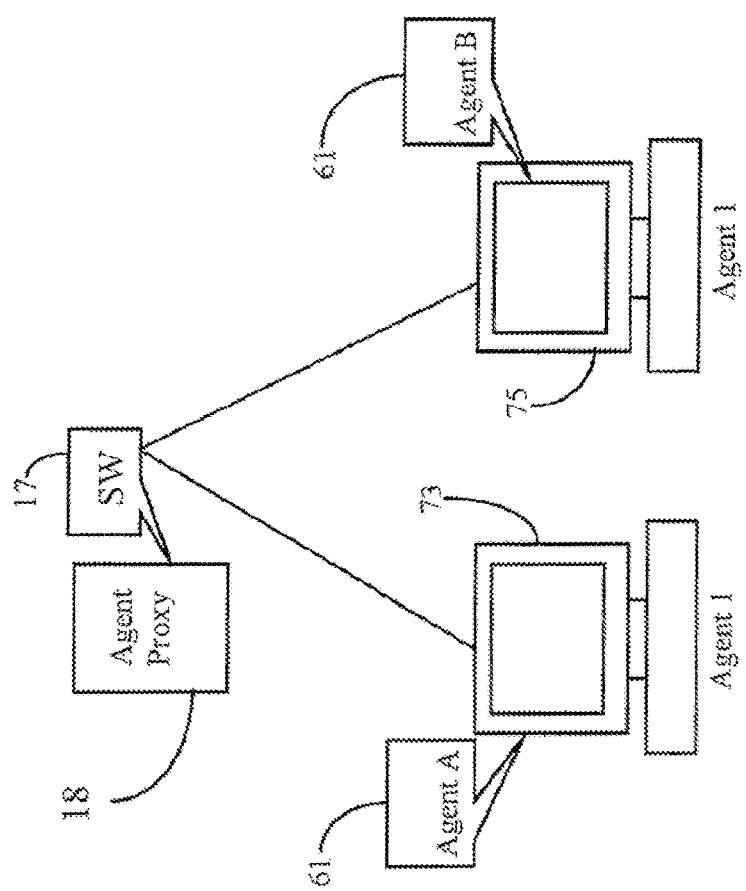
FIG. 2 is a connection diagram illustrating status management capabilities for an agent having more than one computer terminal according to an embodiment of the present invention.

FIG. 2 is a diagram illustrating status management capabilities for an agent having more than one computer terminal according to an embodiment of the present invention. In this example, an agent, labeled herein as agent 1, is operating two separate PC terminals 73 and 75. In this case PC terminal 73 may be adapted for a specific type of data communication while PC terminal 75 may be adapted for another type of data communication. In this example, agent 1 is utilizing two separate presence agents, a presence agent A running on PC terminal 73, and a presence agent B running on PC terminal 75. A single agent proxy SW 17 for agent1 resides on a server 18, analogous to agent proxy 18 of FIG. 1.

Agent presence applications A and B are analogous to SW 61 of FIG. 1 above. In this example, agent proxy SW 17 receives the presence and capabilities information from both presence agent A and presence agent B, and combines them into a single presence entity, which may be reported to an observing and subscribing application such as any routing application in the system.

Presence information may be in the form of Extensible Markup Language (XML) as is used in recent presence protocols. It is noted herein, that if agent 1 is only logged on to the system through PC terminal 73 and PC terminal 75 is logged off, then agent proxy SW 17 would only utilize presence information provided by presence agent A. It will be apparent to one with skill in the art that as a distributed component, proxy 17 functions independently from any other proxy component that may be covering additional agents.

There are in this case, no parent applications or central control applications to which proxy agent 17 or presence agents A or B, for that matter, depend upon. Therefore, an overall system covering many agents will continue to function normally if for example, proxy 17 and presence instances A and B cease to function for any reason. In some embodiments, as described above, presence agents at a single station may report to more than one agent proxy, in which case the failure of one of the agent proxies would not damage system performance. Prior art systems that rely on a central control station or server are vulnerable if for some reason the central controlling host malfunctions or becomes disabled. Moreover, the flexibility provided by distributed components enables agents to utilize the communications applications and platform types to which they are most accustomed. This feature is especially beneficial in a communication network wherein agents operate from remote PCs such as in home office environments. In these cases, the presence reporting capability is compatible with standard transport protocols such as Transfer Control Protocol/Internet Protocol (TCP/IP) utilized on Internet 63 (FIG. 1).

Figure 3:
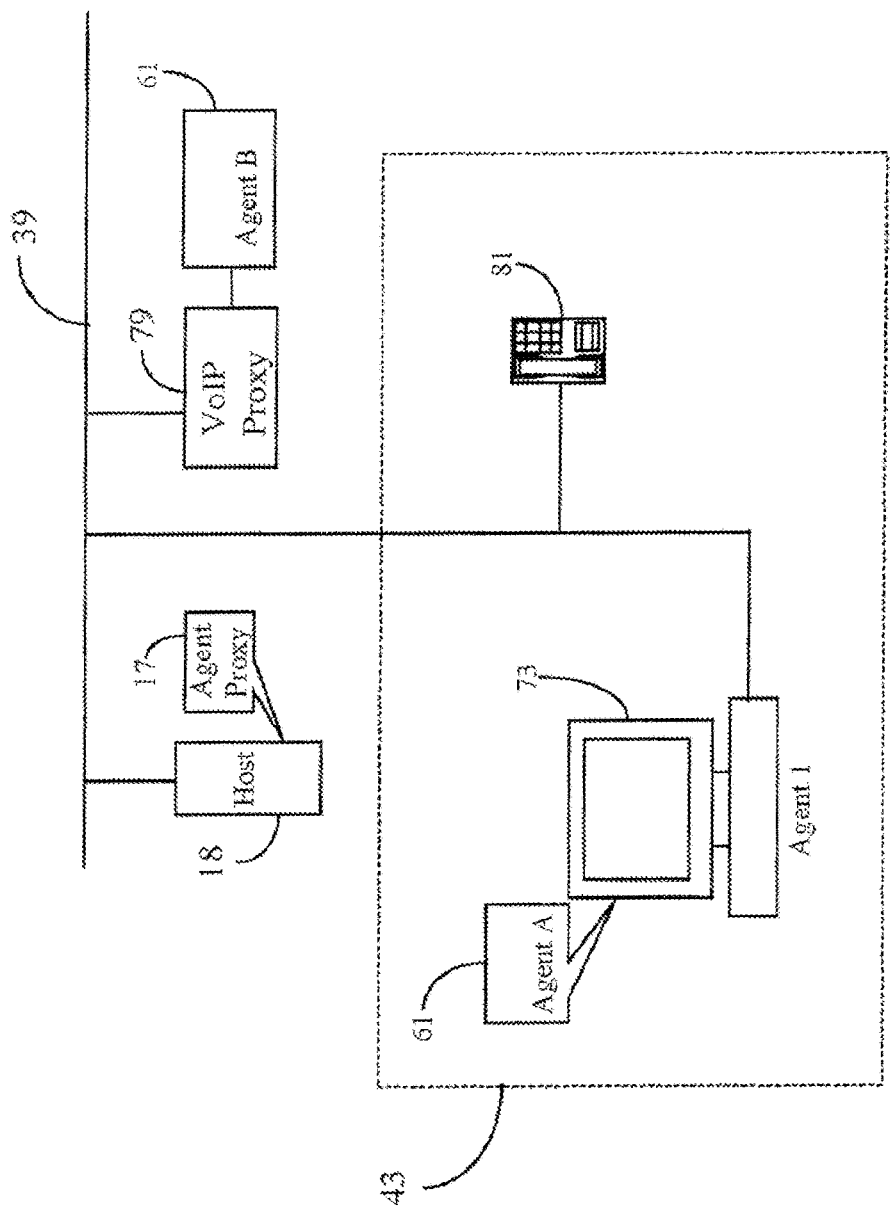
FIG. 3 is a connection diagram illustrating status management capabilities for an agent operating a computer and a telephone.
Figure 4:
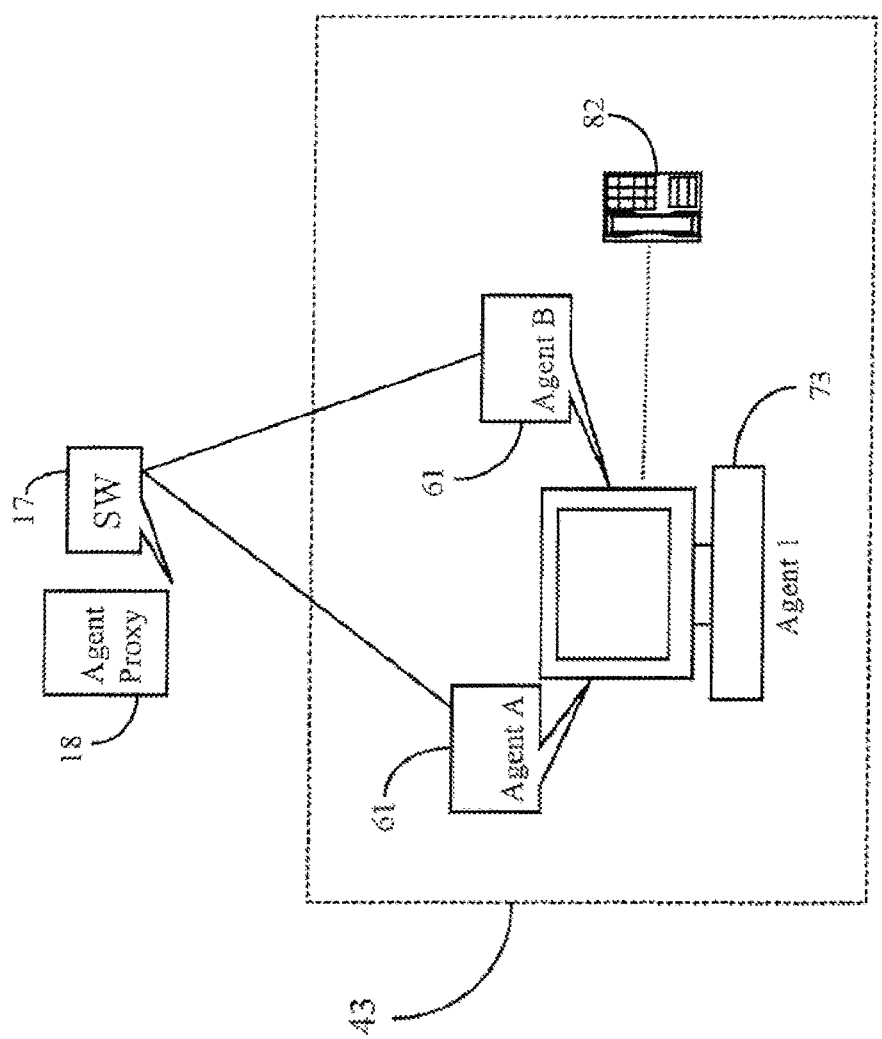
FIG. 4 is a connection diagram illustrating status management capabilities for an agent operating a computer and a connected IP phone.

FIG. 3 is a diagram illustrating status management capabilities for an agent operating a computer and a telephone operating by Voice over IP (VoIP) protocol. An agent station 43 is illustrated (See FIG. 1) wherein an agent1 has access to a PC/VDU 73 and a VoIP telephone 81. Both are connected to LAN 39. A presence agent A (61) executes on PC/VDU 73 and reports status to agent proxy 18 running SW 17. Telephone 81 operates through a VoIP proxy 79, which also executes an instance of presence agent 61, which in turn reports to agent proxy 18. Agent proxy 18 responsible for agent station 43 in this example thus gets status information for both the VoIP telephone and the PC/VDU at agent station 73, and combines the information for an integrated status for station 43. FIG. 4 is a connection diagram illustrating status management capabilities for an agent operating a computer PC/VDU 73 and a connected IP phone 82. In this example, agent 1 is responsible for communication events routed to PC 73 and communication events routed to IP telephone 82. IP phone 82 is Internet-capable and adapted to receive calls originating from Internet 63 of FIG. 1 above. In this case, there are 2 presence agents, A) and B both running on PC 73, both labeled 61. Presence agent A monitors communication applications executing on PC 73 while presence agent B monitors activity states of IP phone 82. It is assumed in this example that IP phone 82 cannot locally support software 61. Both agents A and B report to agent proxy SW 17 running on agent proxy 18. In this case, VoIP events are handled through PC/VDU 73 acting as a host. The presence reporting capabilities of agent B are built on top of a telephony application programming interface (TAPI) protocol. It is noted herein that in one embodiment presence agents A and B may be combined as one presence agent reporting communication and capability states of PC 73 and IP phone 82 as will be described below.

Figure 5:
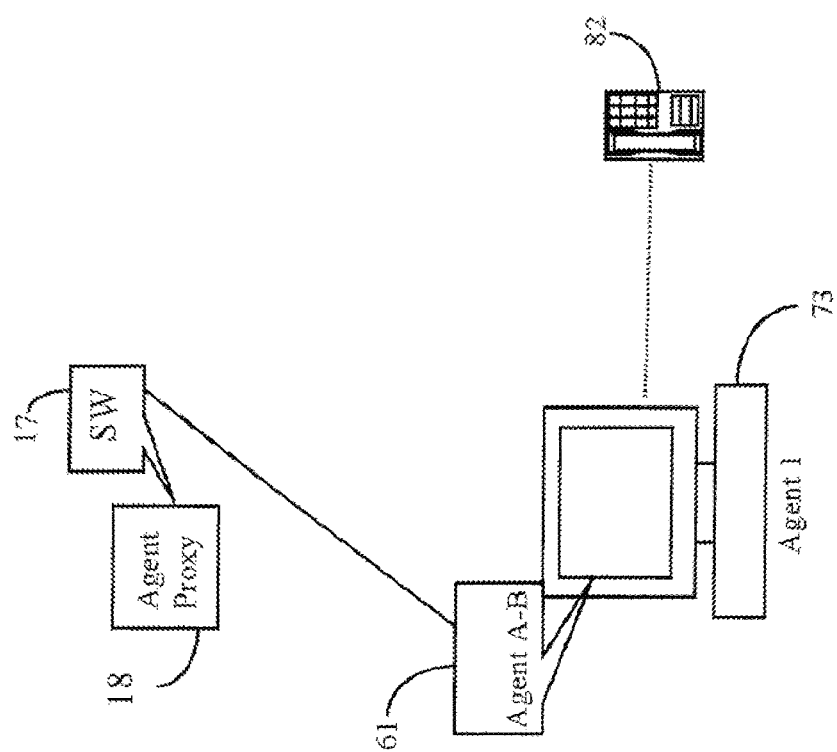
FIG. 5 is a connection diagram illustrating status management capabilities using a combined presence application.

FIG. 5 is a diagram illustrating status management capabilities using a combined presence application. A single presence application 61 (A-B) is provided and combines the monitoring and reporting duties of presence agents A and B of FIG. 4. In this case, IP phone 82 is either serially (cabled) or universally (USB cabled) connected to PC 73 for status monitoring purposes and telephony management. Proxy SW 17 operates on agent proxy 18, which receives all of the capability and activity information of PC 73 and of IP phone 82.

It is noted that although a PC and phone combination are used in the examples presented herein, other communications devices and/or systems may be monitored by presence agents executing on the monitored device or system, or executing on a connected processor or routing device. For example, an automated fax machine may have a facsimile queue that is monitored by a presence agent. The presence agent, in this case, reports to an agent proxy the number of faxes waiting to be sent and the estimated time of receipt of a fax as requested by an observing application on behalf of a customer request, for example. Therefore, a presence application can be personalized to a communications terminal shared by many agents and does not necessarily have to be personalized to a single agent or to a controlled agent group.

Figure 6:
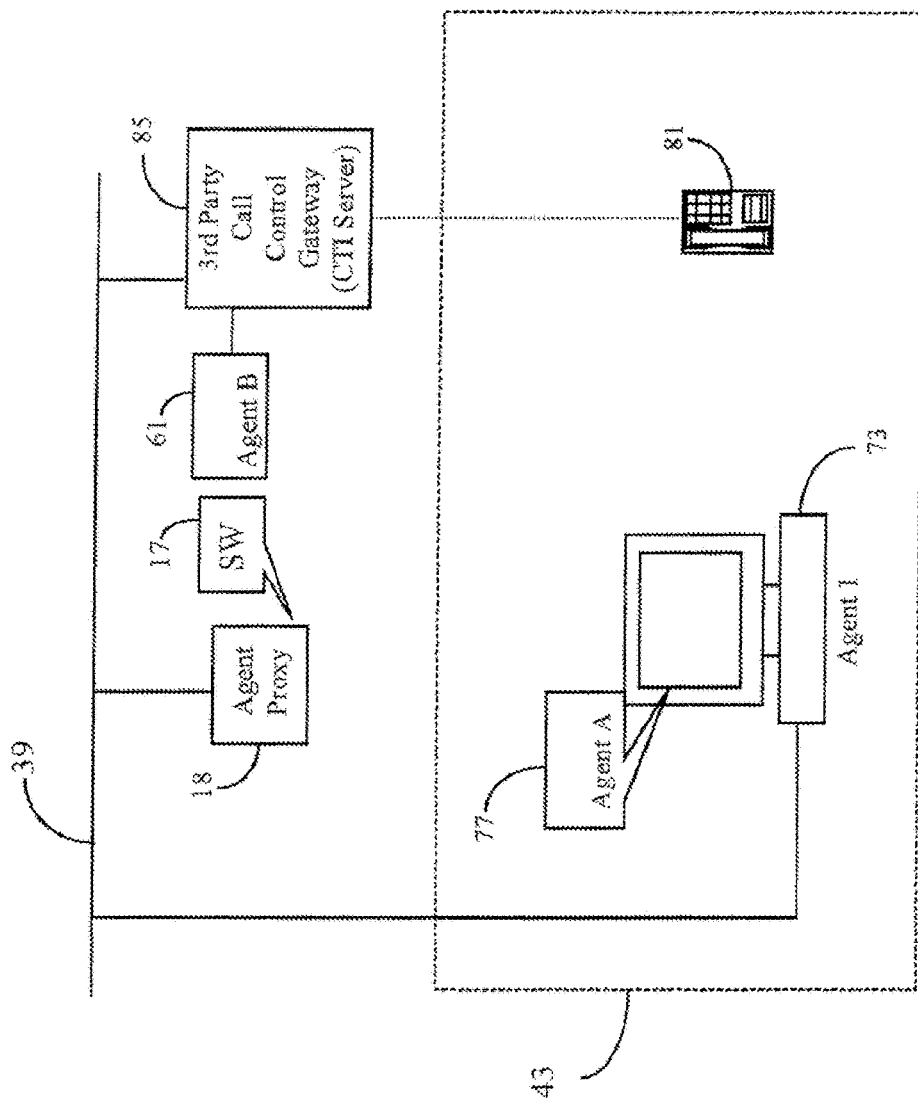
FIG. 6 is a connection diagram illustrating status management capabilities utilizing a third party gateway.

FIG. 6 is a diagram illustrating status management capabilities utilizing a third party gateway 85. In some cases, wherein a particular communications terminal cannot be locally monitored, a presence agent may be utilized to monitor a communications gateway associated with a target device. Such a case is illustrated here. In this case a telephone 81 is operated through third-party gateway 85, and an instance of presence server SW 61 is provided to and executes on the gateway server 85, where it monitors status for phone 85. The gateway is shown as connecting to LAN 39, thence to agent proxy 18, but may communicate indirectly with agent proxy 18, which operates with an instance of SW 17 and integrates status information for agent station 43.

Several specific embodiments of the present invention have been described in some detail herein, and it is emphasized that these are exemplary, and the invention may manifest in a variety of ways. For example, the embodiments described have been primarily within a communication center providing status information for subscribing applications also within the communication center. In alternative embodiments there may be several call centers each with multiple agents and agent stations, and agent proxies may be provided for groups of agents at each call center, and in a hierarchical fashion higher-level agent proxies may be provided integrating information for each center and for groups of centers, and for all centers. Subscribing applications may be local to a call center, or may subscribe across networks to different call centers, for example. The capabilities of the distributive aspects of the present invention render it useful over a diverse topology in this manner Subscribing applications in such a system may well be network-level routers, now capable of agent-level routing over a very diverse structure and over a combination of devices, networks, and protocols.

It will be apparent to one with skill in the art that the method and apparatus of the present invention may be practiced over a wide variety of integrated networks and sub networks without departing from the spirit and scope of the present invention. Therefore, the method and apparatus of the present invention encompasses a wide range of varying implementations and therefore should be afforded the broadest scope under examination. The spirit and scope of the present invention is limited only by the claims that follow.

What is claimed is:

1. A first server for managing agent status, the first server comprising:
   a processor;
   a memory coupled to the processor, wherein the memory has stored thereon instructions that, when executed by the processor, causes the processor to:
      receive status information from second and third servers, the second and third servers being configured to receive and aggregate status information from first and second agent devices, respectively;
      aggregate the status information from the second and third servers; and
      provide the aggregated status information to a particular device, wherein the second and third servers are in a hierarchical relationship with respect to the first server; and
   an electronic routing device coupled to the processor, wherein the electronic routing device is configured to establish a communication session between one of the first and second agent devices based on the aggregated status information.

2. The first server of claim 1, wherein the second and third servers receive the status information from an agent device periodically, or when a status of a corresponding contact center agent changes.

3. The first server of claim 1, wherein the first server is on a web server, and the first agent device and the second agent device are located remotely from the first server.

4. The first server of claim 1, wherein the first agent device and the second agent device each comprise a plurality of agent devices.

5. The first server of claim 1, wherein the second and third servers each comprise a plurality of lower level servers, each of the lower level servers being configured to receive status information from a plurality of agent devices.

6. The first server of claim 1, wherein the status information comprises at least one of agent presence information, agent availability information, or agent skill information.

7. The first server of claim 1, wherein the particular device is configured to route incoming events to the first agent device or the second agent device.

8. The first server of claim 7, wherein the incoming events comprise at least one of voice call, web based calls, video calls, video mail, electronic mail, or chat message.

9. The first server of claim 1, wherein the second and third servers are configured to receive status information from a third agent device.

10. A method for managing agent status, the method comprising:
   receiving, by a first server, status information from a plurality of second and third servers, the second and third servers being configured to receive and aggregate status information from first and second agent devices, respectively;
   aggregating, by the first server, the status information from the second and third servers;
   providing, by the first server, the aggregated status information to a particular device; and
   establishing, by an electronic routing device, a communication session between one of the first and second agent devices based on the aggregated status information.

11. The method of claim 10, wherein the second and third servers receive the status information from the first agent device and the second agent device periodically, or when a status of an agent changes.

12. The method of claim 10, wherein the first server is on a web server, and the first agent device and the second agent device are located remotely from the first server.

13. The method of claim 10, wherein the first agent device and the second agent device each comprise a plurality of agent devices.

14. The method of claim 10, wherein the second and third servers each comprise a plurality of lower level servers, each of the lower level servers being configured to receive status information from a plurality of agent devices.

15. The method of claim 10, wherein the status information comprises at least one of agent presence information, agent availability information, or agent skill information.

16. The method of claim 10, wherein the particular device is configured to route incoming events to the first agent device or the second agent device.

17. The method of claim 16, wherein the incoming events comprise at least one of voice call, web based calls, video calls, video mail, electronic mail, or chat message.

18. The method of claim 10, wherein the second and third servers are both configured to receive status information from a third agent device.

* * * * *